US011682002B2

(12) United States Patent
Notzon

(10) Patent No.: US 11,682,002 B2
(45) Date of Patent: Jun. 20, 2023

(54) METHODS AND SYSTEMS FOR INTERACTIVE DATA MANAGEMENT

(71) Applicant: MARKETSPRINGPAD IP USA LLC., Laredo, TX (US)

(72) Inventor: Nora Lee Notzon, London (GB)

(73) Assignee: MARKETSPRINGPAD IP USA LLC., Laredo, TX (US)

(*) Notice: Subject to any disclaimer, the term of this patent is extended or adjusted under 35 U.S.C. 154(b) by 238 days.

(21) Appl. No.: 16/893,957

(22) Filed: Jun. 5, 2020

(65) Prior Publication Data
US 2021/0383361 A1    Dec. 9, 2021

(51) Int. Cl.
*G06Q 20/36*   (2012.01)
*G06T 13/80*   (2011.01)
*H04L 67/306*  (2022.01)
*G06K 19/077*  (2006.01)
*G06Q 30/0201* (2023.01)

(52) U.S. Cl.
CPC .......... *G06Q 20/363* (2013.01); *G06T 13/80* (2013.01); *H04L 67/306* (2013.01); *A63F 2300/5553* (2013.01); *G06K 19/07749* (2013.01); *G06Q 30/0201* (2013.01)

(58) Field of Classification Search
CPC .......... G06Q 20/363; G06K 19/07749; G06T 13/80; G06F 2300/5553
See application file for complete search history.

(56) References Cited

U.S. PATENT DOCUMENTS

| 9,424,605 B2 | 8/2016 | Zellner et al. |
| 10,504,385 B1* | 12/2019 | Harris ............ G09B 19/18 |
| 2006/0212444 A1* | 9/2006 | Handman ......... G11B 27/10 |
| | | 707/999.005 |
| 2013/0204825 A1* | 8/2013 | Su .................. G06N 5/02 |
| | | 706/46 |
| 2017/0193530 A1 | 7/2017 | Newsum et al. |
| 2019/0108686 A1* | 4/2019 | Spivack ......... G06Q 30/0277 |

(Continued)

FOREIGN PATENT DOCUMENTS

WO    2019216999 A1    11/2019

OTHER PUBLICATIONS

Sep. 15, 2021—(EP) Search Report of EP Application 21177703—pp. 2.

*Primary Examiner* — Andrea C Leggett
(74) *Attorney, Agent, or Firm* — Banner & Witcoff, Ltd.

(57) ABSTRACT

The processor(s) may be configured to electronically process a computer readable set of user data records to generate media consumption data. The processor(s) may be configured to electronically process the computer readable set of user data records to generate social media interaction data. In some implementations, the processor(s) may be configured to electronically process the computer readable set of user data records to generate gaming interaction data. In yet some implementations, the processor(s) may be configured to electronically process the computer readable set of user data records to generate a computer readable virtual wallet with kinetic avatar data associated with at least one of the user data records. The processor(s) may be configured to electronically process the virtual wallet including a digital virtual credit card attribute data. The processor(s) may be configured to be housed on a substrate body.

22 Claims, 16 Drawing Sheets

(56) References Cited

U.S. PATENT DOCUMENTS

2019/0251538 A1\* 8/2019 Grosh .................... G06Q 20/14
2020/0005196 A1\* 1/2020 Cai ..................... G06F 16/9535
2021/0365526 A1\* 11/2021 Sachson ................ G06F 16/635

\* cited by examiner

METHODS AND SYSTEMS FOR INTERACTIVE DATA MANAGEMENT

FIELD OF THE DISCLOSURE

The present disclosure relates to methods, systems, and computing platforms for data interactive management with electronic digital avatars.

BACKGROUND

The age of Big Data is upon us. In the internet-of-things era, many digital products can be connected to the internet. Online gaming can be provided over computer networks. The world contains a vast amount of digital information which is getting ever vaster more rapidly. The effect is being felt everywhere, from business to science, from governments to the arts. In this environment, hundreds of millions of people globally are discouraged from learning to invest. Investing is the process of deploying savings in such a way that they can generate more consumption power in real terms in the future than could have enjoyed by spending those savings today. This relatively low lack of participation by the public has been recognized as an issue. There is a need to improve the technological processing in the new computing era.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Aspects of the present disclosure may relate to a system and method configured for data processing that aggregates one or more of customized content for virtual objects functionality, gamification functionality, social functionality, content management functionality and asset order execution functionality. The system and method is supported by multiple components, such as engines or modules.

In some implementations, the described technologies can be used for virtual credit card generation with a customized digital personal avatar or kinetic avatar pertaining to a user. For example, the described technologies may provide the user with the ability to generate a credit card may be loaded with cash from the system's wallet, from the user's regular credit card and/or the user bank account (as selected by the user).

In some implementations, the described technologies can be used for virtual wallets with credit/debit records or physical credit/debit records generation with a kinetic digital bitmoji pertaining to a user. For example, the described technologies may provide the user with the ability to generate a credit card. The bitmojis on virtual cards or physical cards with flexible or rigid substrate bodies could be changed to reflect: different personal moods, emotions or behaviors, different circumstances, such as the financial environment or activity in which the user is engaged, and differing levels of income, savings or investment performance associated with the user. In some implementations, the described technologies can be used to print an image representative of the kinetic avatar or bitmoji data on a card substrate body.

In some implementations, the described technologies can enable payment and/or e-commerce capabilities in various situations. For example, the system may have access to the user's credit card database information—virtual representation or physical. The system 300 may also be used with regular e-commerce web sites, including those which are not connected to the described technologies' payment system.

Aspects of the present disclosure relate to a system and method that provides a rich big data user experience on a technology platform environment. Aspects of the present disclosure relate to a system and method that provides rich big data sets derived from the user experience, and utilizes the outputs from a profiling process to provide rich content and associate with one or more digital personal avatars or user kinetic avatars pertaining to a user.

The system may include one or more hardware processors configured by machine-readable instructions. The processor(s) may be configured to electronically process a computer readable set of user data records to generate media consumption data.

The processor(s) may be configured to electronically process the computer readable set of user data records to generate a computer readable virtual wallet with kinetic avatar data associated with at least one of the user data records. The processor(s) may be configured to electronically process the virtual wallet including a digital virtual credit card attribute data. The processor(s) may be configured to electronically process the virtual wallet including a digital virtual debit card attribute data. The processor(s) may be configured to electronically process digital virtual debit card attribute data or a digital virtual debit card attribute data linked to a kinetic avatar data associated with user data record.

The processor(s) may be configured to electronically process the kinetic avatar data including bitmoji data. The processor(s) may be configured to electronically process the virtual wallet including a digital virtual debit card attribute data. The processor(s) may be configured to electronically process digital virtual debit card attribute data or a digital virtual debit card attribute data linked to bitmoji data associated with user data record.

The processor(s) may be configured to electronically process the computer readable set of user data records to generate social interaction data. In some implementations, the processor(s) may be configured to electronically process the computer readable set of user data records to generate gaming interaction data.

In some implementations of the system and method, a gamification engine provides simulated trading activity within a portfolio management game. The gamification engine may provide real time mark to market of user account simulated trades and portfolios across global instruments and all major asset classes. In some implementations of the gamification engine, a live real-time fantasy league game play leaderboard is provided. In some implementations of the gamification engine, there is provided the ability to follow other user simulated trades, view their simulated portfolios and deep analysis into their holdings. In some implementations of the gamification engine, there is provided the ability for user member to create and manage their own private leagues and invite friends both from within the user community.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

In the following description of the various embodiments, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
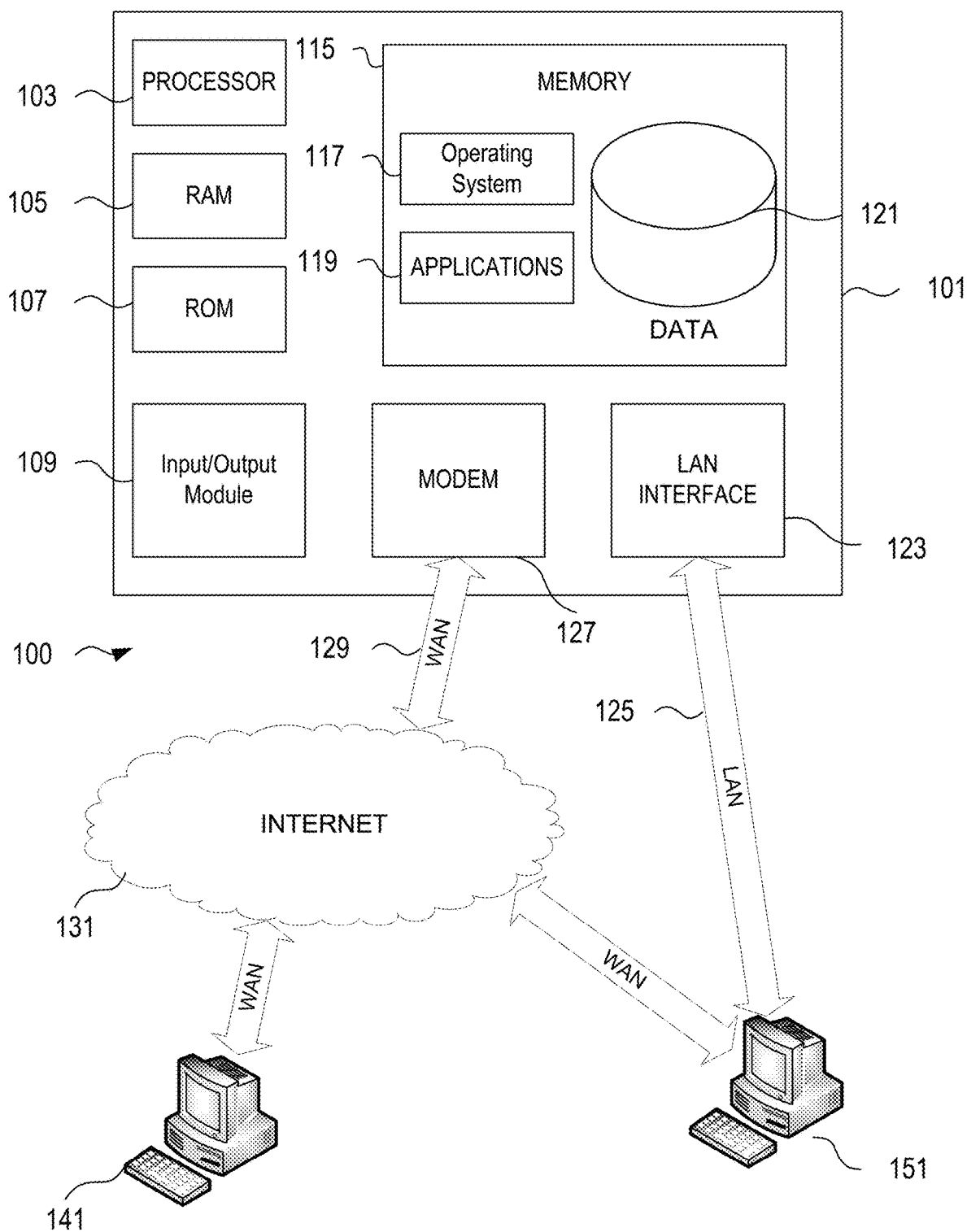
FIG. 1 illustrates a schematic diagram of a digital computing environment in which certain aspects of the present disclosure may be implemented.

FIG. 1 illustrates a block diagram of a specific programmed computing device 101 (e.g., a computer server) that may be used according to an illustrative embodiment of the disclosure. The computer server 101 may have a processor 103 for controlling overall operation of the server and its associated components, including RAM 105, ROM 107, input/output module 109, and memory 115.

Input/Output (I/O) 109 may include a microphone, keypad, touch screen, camera, and/or stylus through which a user of device 101 may provide input, and may also include one or more of a speaker for providing audio output and a video display device for providing textual, audiovisual and/or graphical output. Other I/O devices through which a user and/or other device may provide input to device 101 also may be included. Software may be stored within memory 115 and/or storage to provide computer readable instructions to processor 103 for enabling server 101 to perform various technologic functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of characteristics associated with vendors and patrons, allowing functional interoperability between different elements located at multiple physical locations.

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various protocols such as TCP/IP, Ethernet, FTP, HTTP and the like is presumed. The network connections may be provided according to any desired encoding and modulating scheme, including Bluetooth, ZIGBEE, Z-Wave, cellular, radio frequency, WIFI, near field communications (NFC) and the like.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of computing systems, environments, and/or configurations that may be suitable for use with the disclosure include, but are not limited to, personal computers, server computers, handheld or laptop devices, multiprocessor systems, microprocessor-based systems, cloud-based systems, set top boxes, programmable consumer electronics, network PCs, minicomputers, mainframe computers, mobile computing devices, e.g., smart phones, wearable computing devices, tablets, distributed computing environments that include any of the above systems or devices, and the like.

The disclosure may be described in the context of computer-executable instructions, such as program modules, being executed by a computer. Generally, program modules include routines, programs, objects, components, data structures, etc. that perform particular tasks or implement particular computer data types. The disclosure may also be practiced in distributed computing environments where tasks are performed by remote processing devices that are linked through a communications network. In a distributed computing environment, program modules may be located in both local and remote computer storage media including memory storage devices.

Figure 2:
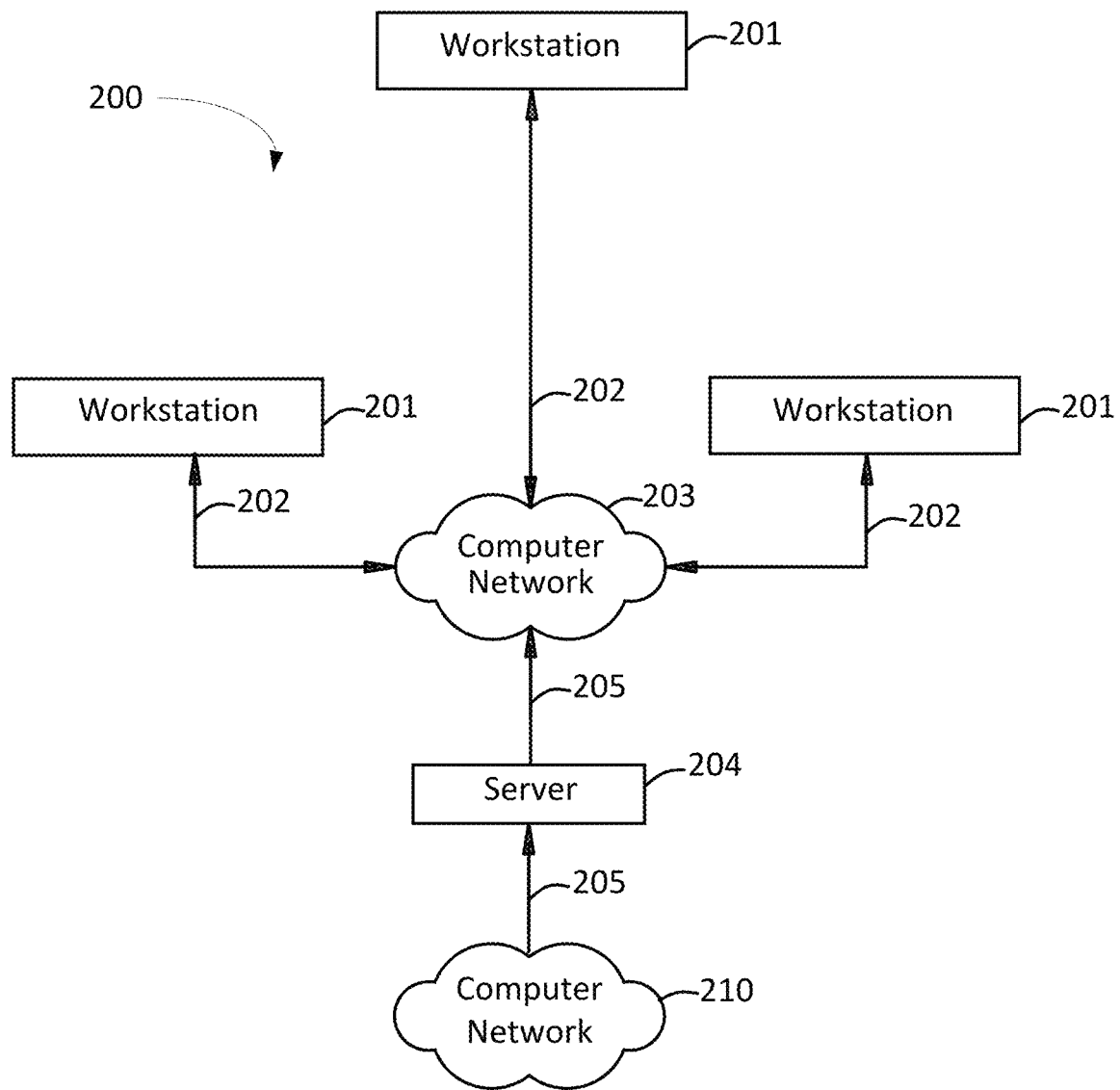
FIG. 2 is an illustrative block diagram of workstations and servers that may be used to implement the processes and functions of certain embodiments of the present disclosure.

Referring to FIG. 2, an illustrative system 200 for implementing methods according to the present disclosure is shown. As illustrated, system 200 may include one or more workstations 201. Workstations 201 may be local or remote, and are connected by one or more communications links 202 to computer networks 203, 210 that is linked via communications links 205 to server 204. In system 200, server 204 may be any suitable server, processor, computer, or data processing device, or combination of the same. Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

Figure 3:
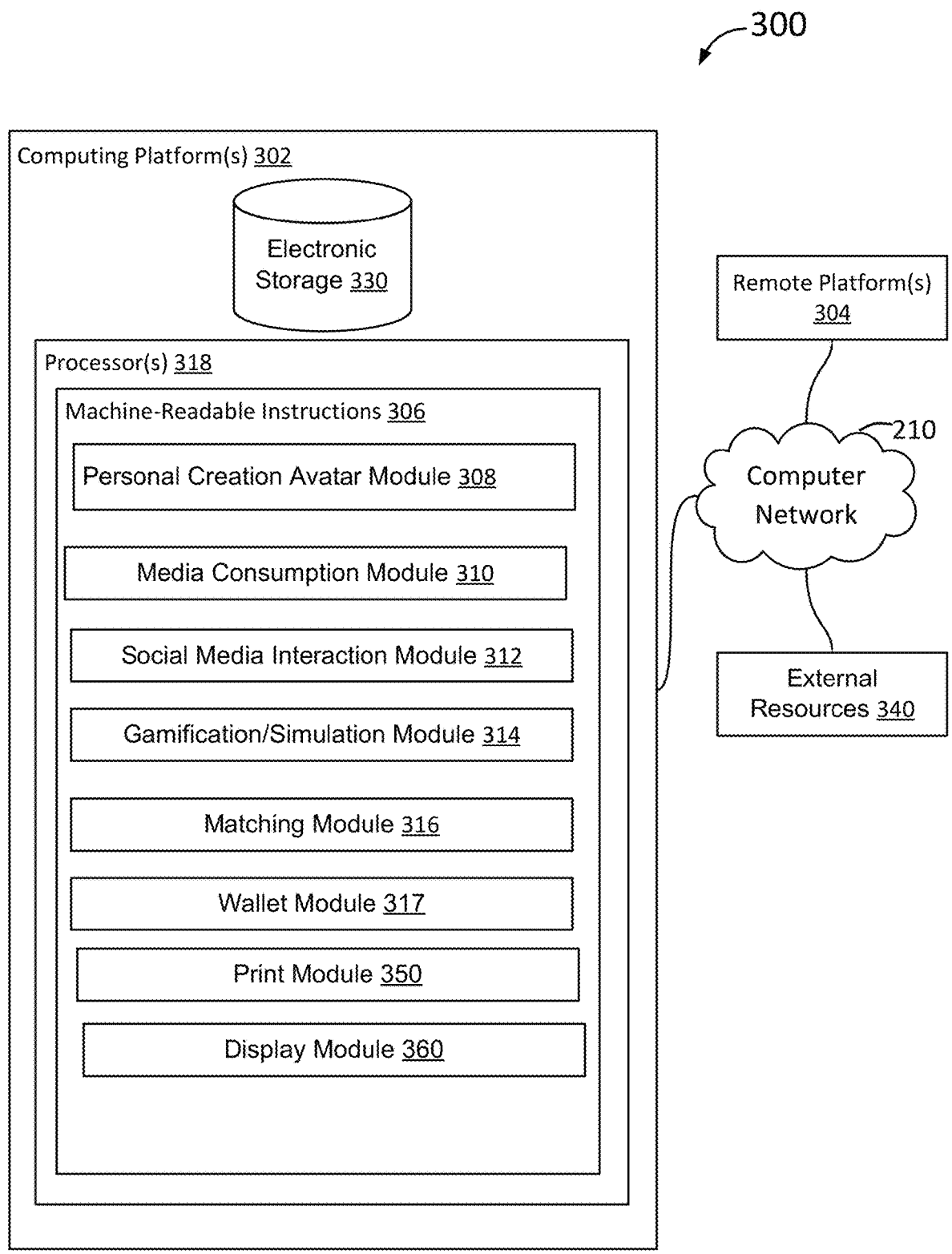
FIG. 3 illustrates a system configured for data processing, in accordance with one or more implementations.

FIG. 3 illustrates a system 300 configured for data processing, in accordance with one or more implementations. The disclosure may be described in the context of cloud-based computing architecture employing Amazon Web Service (AWS).

Nevertheless, other commercially available cloud-based services may be used, such as Microsoft Azure, and Google Cloud. The system 300 API components may be provided in the AWS cloud and have been architected to scale in a resilient manner through the use of technologies chosen without any legacy dependencies. In some implementations of the system 300 and method, main persistent data storage pertains to Amazon DynamoDB—a fully managed proprietary NoSQL database service that supports key-value and document data structures—where content, interaction, profile and other non-financial information is stored. In some implementations of the system 300 and method, social graph data (i.e. relationships between users) is stored on Amazon Neptune—a fully managed graph database. In some implementations of the system 300 and method, scalability is supported by multiple Redis (Remote Dictionary Server by Redis Labs) clusters acting as read only in-memory databases. In some implementations of the system 300 and method, data is warehoused on Amazon Redshift—a cloud data warehouse—and reporting capability is built with Tableau BI toolset. In some implementations of the system 300 and method, API components (including daemons and engines) are coded in node.js with the exception of AI daemons that are coded with Python (with Google TensorFlow for clustering). In some implementations of the system 300 and method, some API components are executed on AWS Lambda (serverless computing) allowing highly scalable capacity to respond to user database interactions and system failure/warnings.

In some implementations, system 300 may include one or more computing platforms 302. Computing platform(s) 302 may be configured to communicate with one or more remote platforms 304 according to a client/server architecture, a peer-to-peer architecture, and/or other architectures. Remote platform(s) 304 may be configured to communicate with other remote platforms via computing platform(s) 302 and/or according to a client/server architecture, a peer-to-peer architecture, and/or other architectures. Users may access system 300 via remote platform(s) 304.

In some implementations of the system 300 and method, user registration, profile creation and maintenance is provided. In some implementations of the system 300 and method, a security database, discovery mechanisms and instrument watchlist maintenance are provided to the user. In some implementations of the system 300 and method, the technology enables synchronization of the instrument database with multiple brokerage/custody systems. In some implementations of the system 300 and method, the technology enable social graph functionality by allowing discovery and following of other users in the system. In some implementations of the system 300 and method, social functionality enables posting on a media feed 700, the indications of liking, commenting and sharing posts—via a social graph database that allows for relationship maintenance. In some implementations of the system 300 and method, delivery of event notices to client devices is enabled via a mobile event management component with "Over-The Air' infrastructure technology. In some implementations of the system 300 and method, a two-way external social network interaction can be used to share from the media feed 700 onto other social networks and sharing of external content onto the media feed 700.

Figure 12:
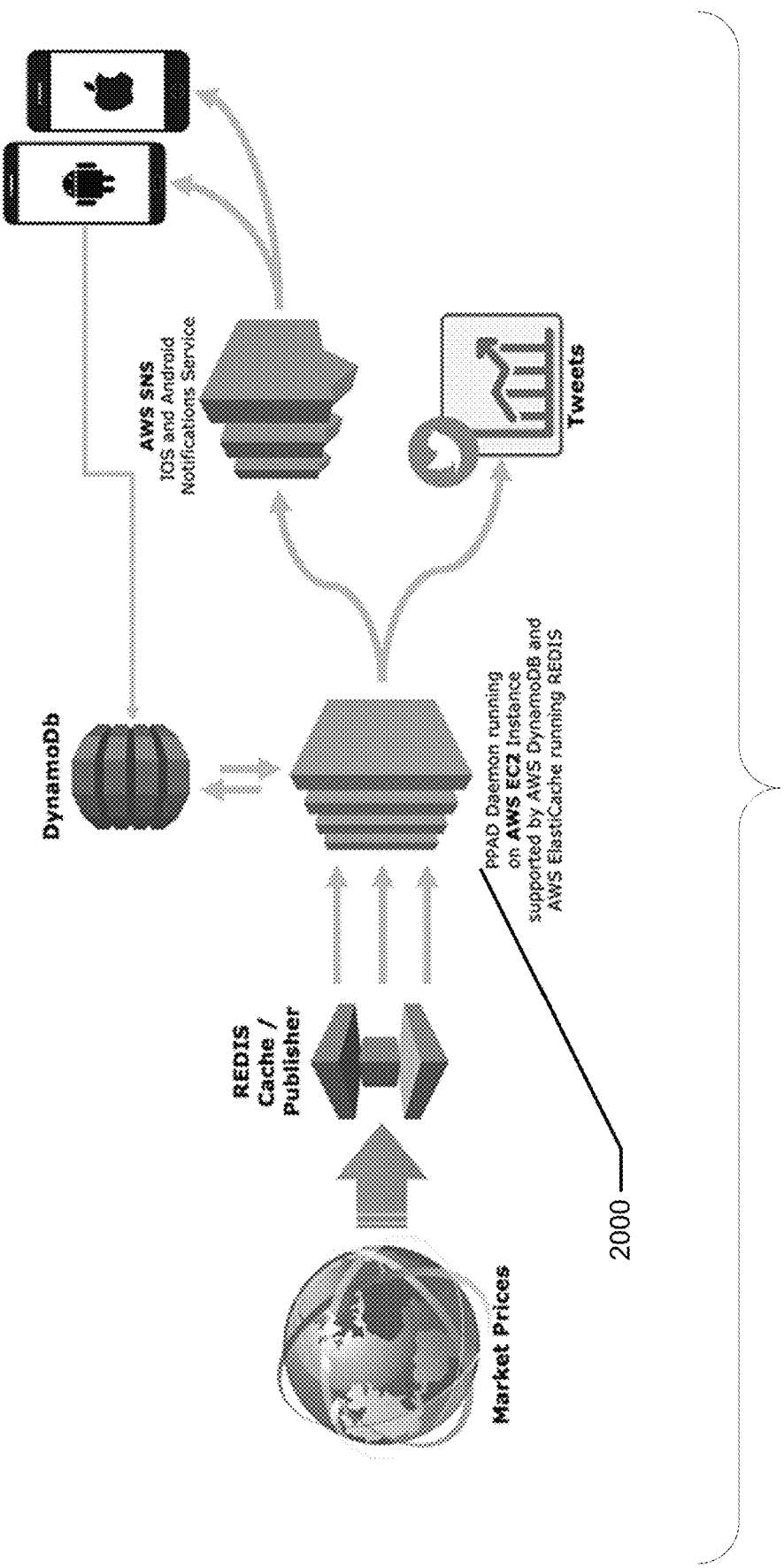
FIG. 12 is an example block diagram of an illustrative PPAD engine in accordance with one or more implementations.

Some implementations of the system 300 and method enable market data delivery of real time price data to users and delivery of price and game position profit/loss alerts to clients as notifications using PPAD engine 2000 (see FIG. 12). In some implementations, delivery of historical market data for charts and technical analysis can be provided to the mobile client (e.g., smart phones, wearable computing devices, tablets).

In some implementations of the system 300 and method, media content such as news, commentaries, calendars, fundamental data, research and community sentiment are delivered individually and tailored news, commentaries and research content to each user's feed 700. Users also have the ability to search through all historic news articles and community posts. Some implementations provide an "at-a-glance" Instrument Scores calculated from fundamental instrument data through the system 300. Additionally, real-time user community sentiment and trading accuracy can be provided to the user on a per instrument basis.

Computing platform(s) 302 may be configured by machine-readable instructions 306. Machine-readable instructions 306 may include one or more instruction modules or engines. The instruction modules may include computer program modules. The instruction modules may include one or more of personal avatar engine/module 308, media consumption module 310, social media interactions module 312 and a gamification module 314, a matching module 316, a wallet module 317, a print module 350, a display module 360 and/or other instruction modules.

With reference to FIG. 3, in some implementations of the system 300 and method, customized digital content is provided by a user configured with a personal avatar module 308 having machine-readable instructions 306. The module 308 can have instructions that enable maintaining customized Bitmojis or other personal avatars for the user. One particular type of customized content for the general virtual objects provided herein can implement the use of personalized cartoon avatars or "Bitmojis." Such virtual objects can be referred to generally as personal avatars, whether provided by Bitmoji or any other particular entity. Various details regarding the specific application of these personal avatars as virtual objects are provided herein, and it will be understood that such details might also be applied to other types of virtual objects in other contexts or applications as well.

On a user's financial profile vector on system 300, the bitmoji data 500 could be customized either programmatically or at the instigation of the user to reflect a person's financial mood or circumstance, conveying to the viewer much more information that a typical profile photograph. It is contemplated that customized personal avatar virtual object content can be user created, and that this specific type of content can be stored and deleted according to various user preferences and selections. Customized personal avatars and related content can be readily extrapolated into various specific financial emotion simulation templates and situations based upon a user generated original personal avatar. Each of these avatars and content items can be adjusted and modified to suit particular preferences of a given user, and prior uses can be noted and organized by the system as part of the maintaining process that is provided module 308.

Figure 5:
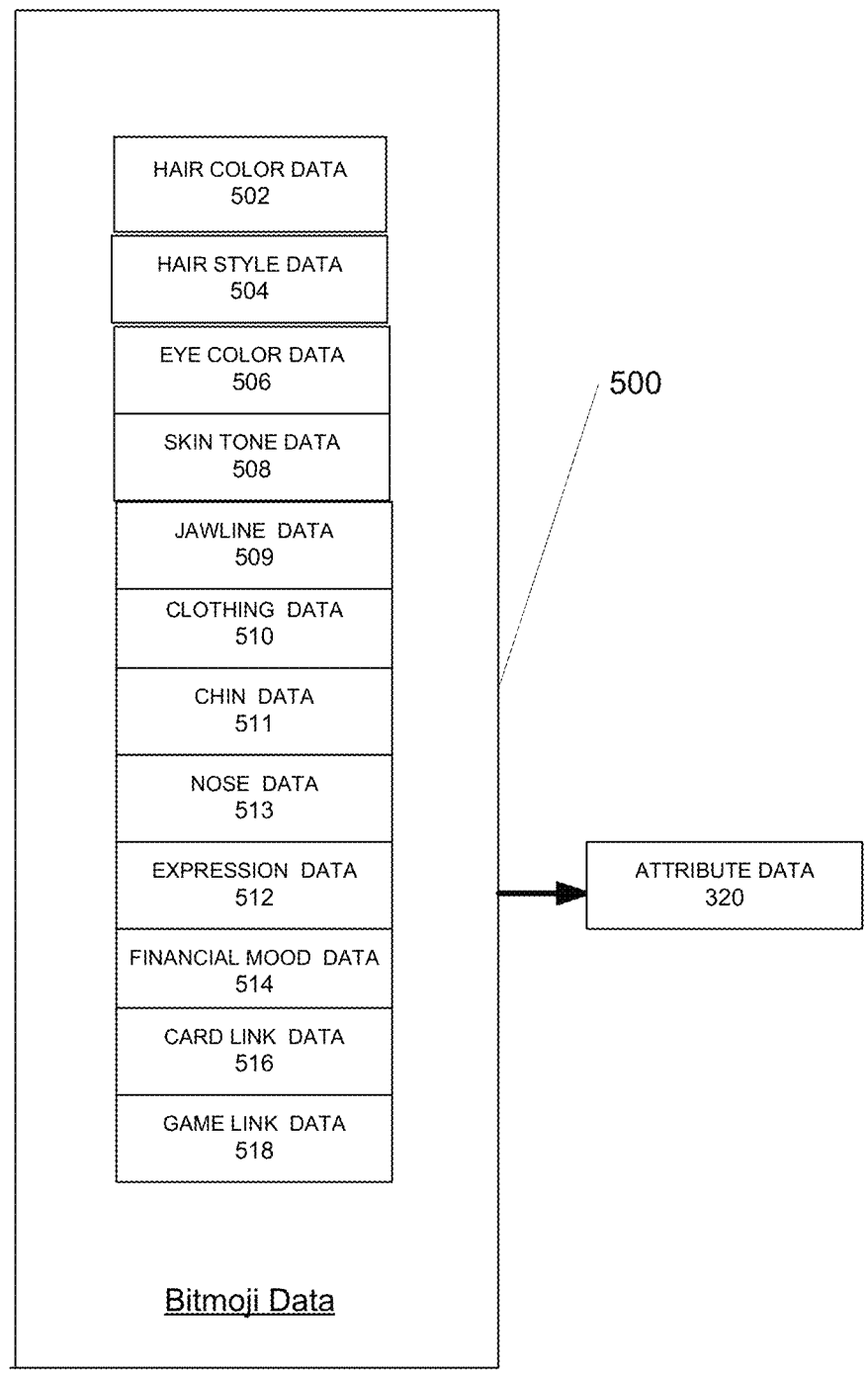
FIG. 5 is an illustrative functional block diagram of a personal avatar or bitmoji data that may be used to implement the processes and functions, in accordance with one or more implementations.

Referring to FIGS. 3 and 5, personal avatar module 308 includes computing components for providing a virtual object creation program (such as cartoon and editing program) for bitmoji data 500 associated with user data to one or more user computers remote platforms 304 and/or external resources 340. Personal avatar module 308 may provide a cartoon creation and editing software program to user computers for execution on the user computers, such as by serving web pages contain or host the cartoon creation and editing program to one or more user computers over the network 210.

Figure 14:
FIG. 14 is an illustrative a virtual digital object in the form of a personal avatar or bitmoji data that may be used to implement the processes and functions, in accordance with one or more implementations.
Figure 15:
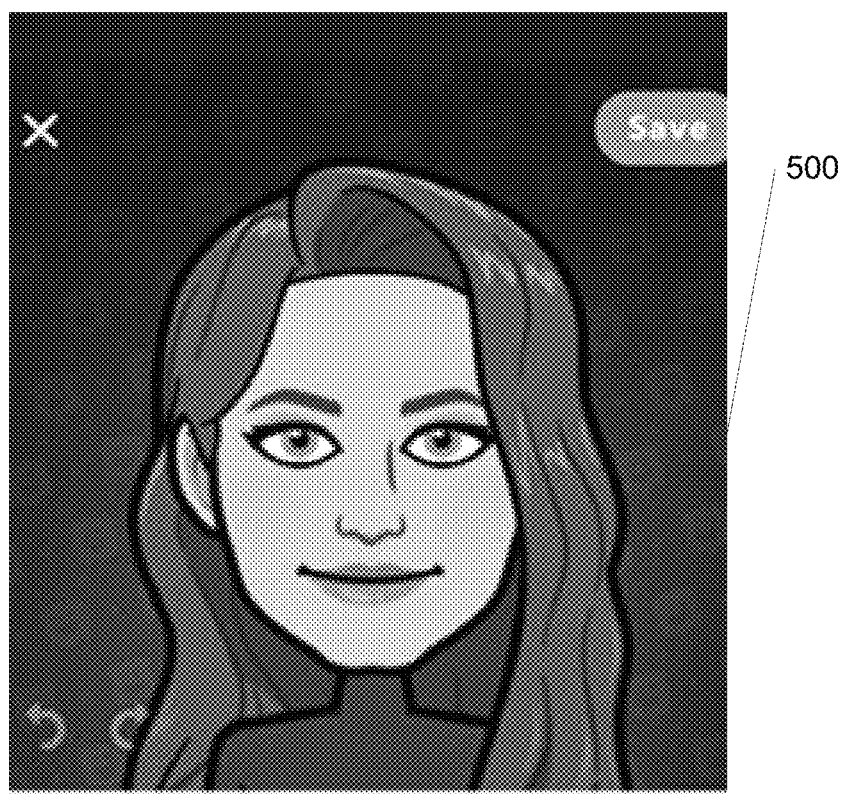
FIG. 15 is an illustrative an alternative virtual digital object in the form of a personal avatar or bitmoji data that may be used to implement the processes and functions, in accordance with one or more implementations.
Figure 16:
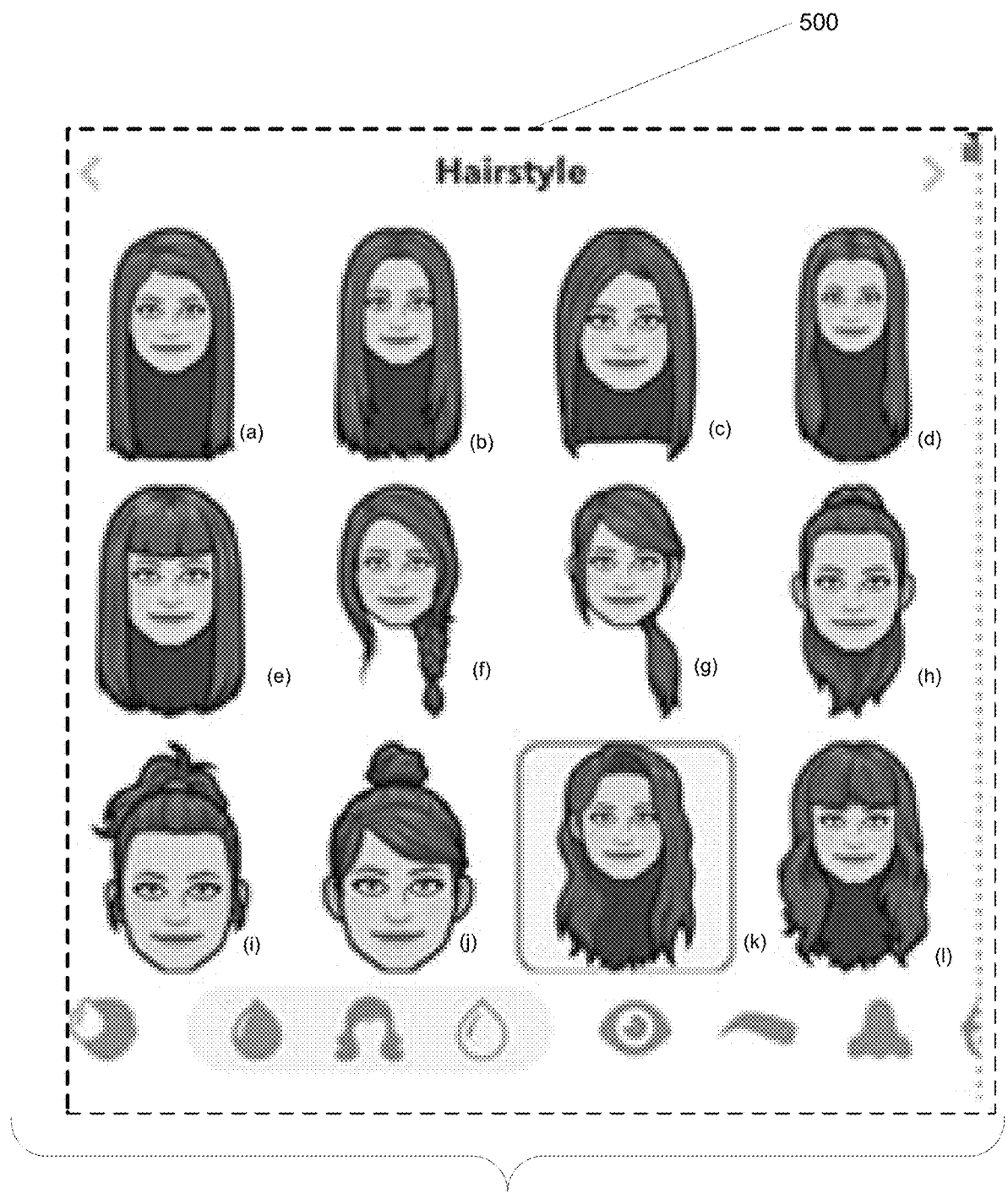
FIG. 16(a)-(l) are illustrative virtual digital objects of a personal avatar or bitmoji data of FIG. 15 that may be used to implement the processes and functions, in accordance with one or more implementations.
Figure 17:
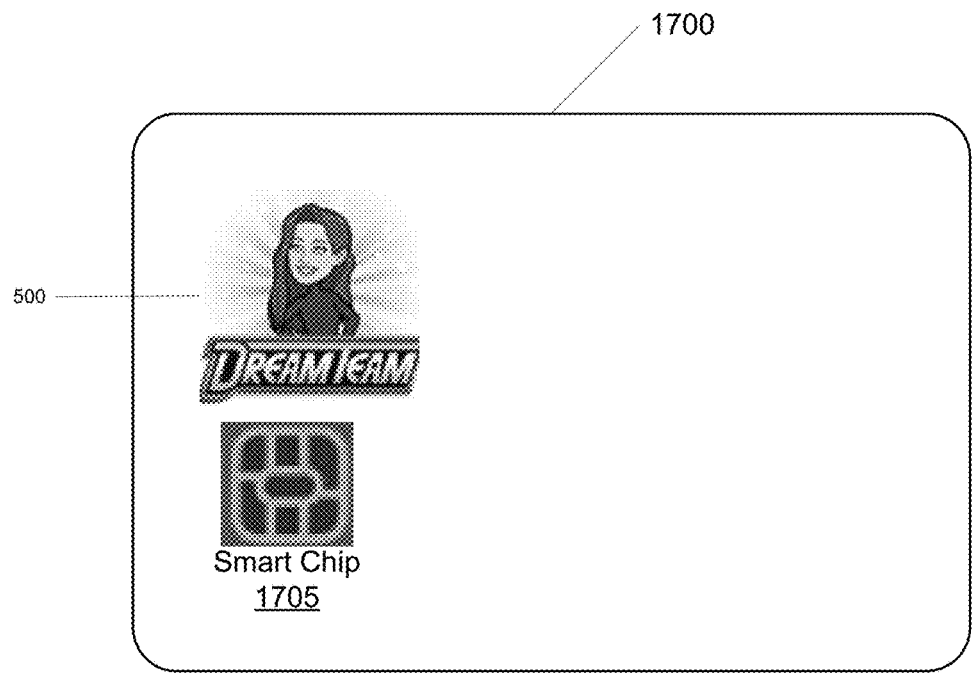
FIG. 17 is an illustrative functional block diagram of a card with a printed personal avatar or bitmoji that may be used to implement the processes and functions, in accordance with one or more implementations.

Referring to FIGS. 3, 5, 14, 15 and 16(a)-(l), personal avatar module 308 provide bitmojis data 500 which may be playful cartoon depictions of people. The software uses personal features, such as hair color 502 and style 504, eye color 506 and/or skin tone 508, jawline 509, chin 511, nose 513 to create cartoon images personalized and unique to each person. As shown in FIGS. 15 and 16(a)-(l), the hair style 504 of the bitmoji 500 can be personalized in many different ways. Bitmojis can be personalized further to add playfulness and character. A person can choose how to 'dress' 510 (clothing data), a bitmoji to add accessories or alter the expression 512 of the bitmoji. In this way, bitmojis can be adapted to reflect different circumstances, environments or financial moods 514. Personal avatar module 308 enables bitmojis that can be changed to reflect a user's changing reality. Or the bitmoji 500 can be managed to portray an alternative reality. An external resource 340 may also comprise one or more pre-drawn cartoon objects suitable for arranging by a user to create or edit a cartoon object, such as pre-drawn comic characters, props, backgrounds, etc., or libraries of pre-drawn comic objects, such as a comic character library, for example. The editing program enables customized characters representative of the appearance of a user from an avatar. External resource 340 may comprise data for one or more viewable virtual object, including one or more comic objects such as comic characters, backgrounds, prop objects, text bubbles, etc, associated with bitmoji data 500 (see FIGS. 5 and 14).

In some implementations of the system 300 and method, a user's physical debit or credit card 1700, 1800, system 300 may implement encryption software (with machine readable instructions 306) which serves to provide the virtual equivalent of a wallet which may contain digital cash-credit card information-shipping details and a digital certificate for authentication of the digital wallet. By including a bitmoji on the card 1700, 1800, the user will feel a greater sense of affinity with that debit or credit card. The card 1700, 1800 becomes an extension of the user rather than an extension of the financial service provider. On a user's virtual debit or credit card, the use of personal bitmojis can be extended to virtual (i.e. de-materialized or digital) cards. A digital wallet module 317 that can be installed on a smartphone or it is an existing built-in feature of a smartphone. Digital wallet 317 may store credit card data 334, debit card data 336, coupons, or reward cards account digital information. Once the wallet 317 is installed and the user inputs payment information, the wallet stores this information by linking a personal identification format such as a number or key, QR code or an image of the owner to each card that is stored.

In a dynamic manner, virtual cards can be updated much more frequently and much more cheaply in implementation. In some implementations in virtual card in wallet 317 or physical card 1800 with display, the bitmojis 500 digitally linked cards 516 could be kinetic or user selectable to reflect: different personal moods, emotions or behaviors of the user; different circumstances of the user, e.g., the financial mood environment data 514 or activity in which the user is engaged; or differing levels of income, savings or investment performance. For example, in an implementation, a person's financial bitmoji 500 could be user kinetically selectable to reflect fear or greed when the user is investing; hunger when the person is paying for a food delivery; joy when a salary or other income has been received into their account.

The modules 308, 310, 312, 314, 316, 317, 350, 360 and other modules implement APIs containing functions/subroutines which can be executed by another software system, such as email and internet access controls. API denotes an Application Programming Interface. The systems and methods of the present disclosure can be implemented in various technological computing environments including Simple Object Access Protocol (SOAP) or in the Representational State Transfer (REST). REST is the software architectural style of the World Wide Web. REST APIs are networked APIs that can be published to allow diverse clients, such as mobile applications, to integrate with the organizations software services and content. Many commonly-used applications work using REST APIs as understood by a person of skill in the art.

With reference to FIG. 3, in some implementations, personal avatar engine/module 308 may receive media consumption attribute data from media consumption module 312, the media interaction attribute data from the social media interactions module 314 and the gaming interaction attribute data from the gamification module 314 to generate at least one user personal avatar virtual object or bitmoji for each user of the system 300. The "attribute data" including ASCII characters in computer readable form or binary complied data, such as biometric data. The ASCII characters or binary data can be manipulated in the software of system 300.

Figure 6:
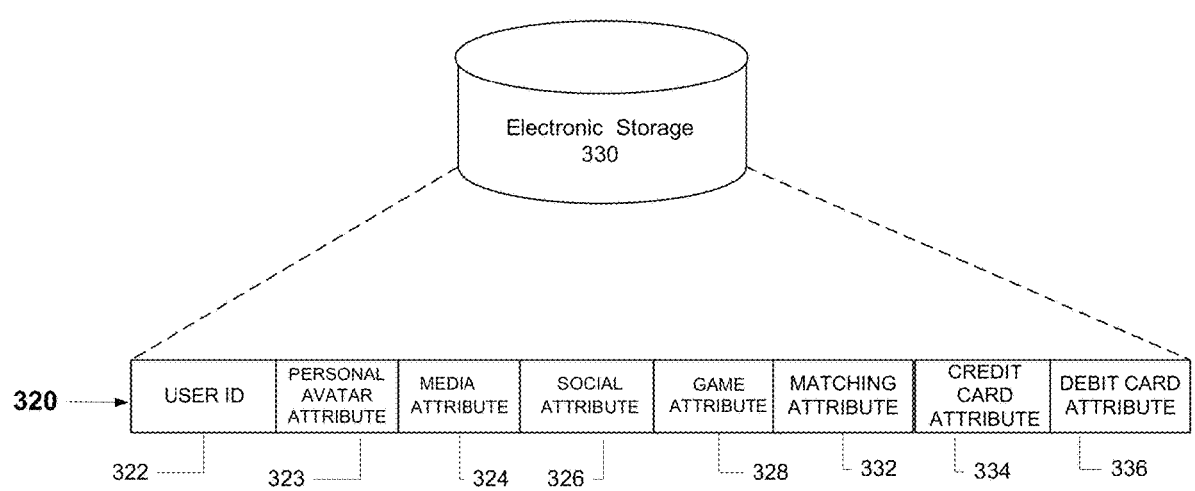
FIG. 6 is an example block diagram of an illustrative user data storage data in accordance with one or more implementations.
Figure 7:
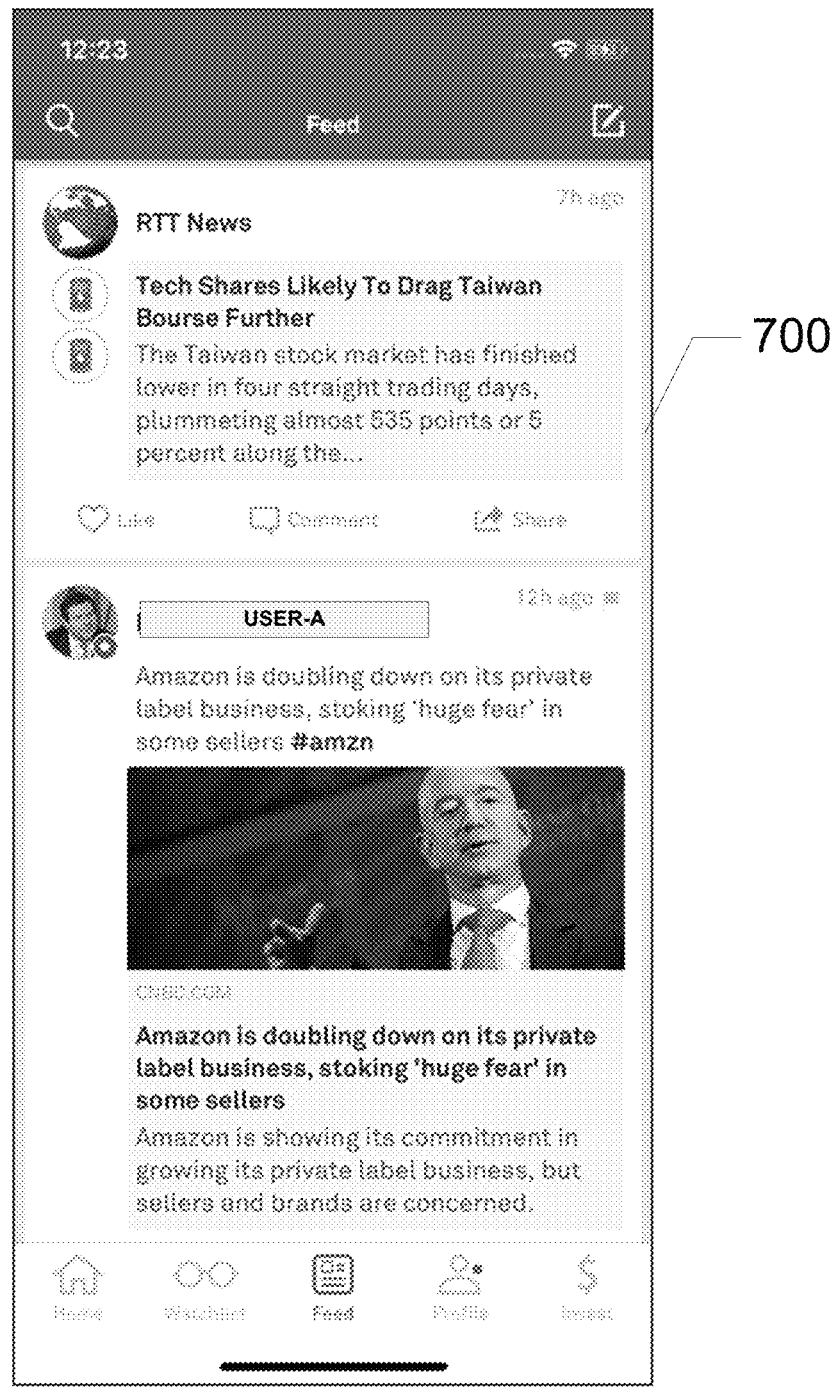
FIG. 7 is an example block diagram of an illustrative user media feed environment in accordance with one or more implementations.

With reference to FIGS. 3, 6 and 7, modules 308, 310, 312, 314, 316, 317, 350, 360 and other modules implement APIs implements attribute data about a user. The attribute data 320 relates to a unique user ID 322. The attribute data 323 pertains to virtual object content—personal avatar data associated with the user so as to generate the financial bitmoji 500. The media consumption analysis may include media attribute records 324 storage indicative of the user's reading of news articles, viewing financial instrument prices, historical charts, technical charts, financial calendars, research reports and like. Media consumption module 310 may be software system implementing an API containing functions/sub-routines. The virtual wallet 317 includes a digital virtual credit card attribute data 334. In other implementations, the virtual wallet 317 includes a digital virtual debit card attribute data 336.

Figure 8:
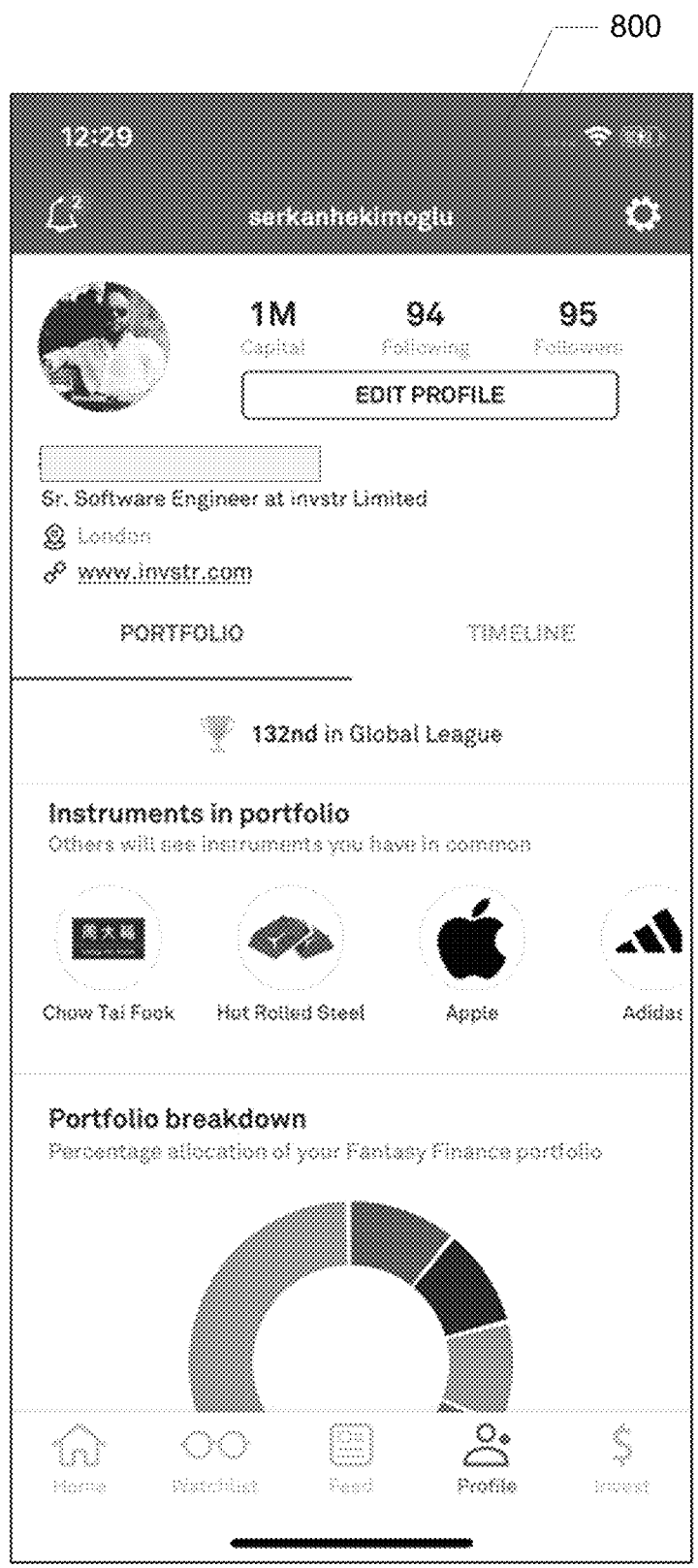
FIG. 8 is an example block diagram of an illustrative social interactions environment set in accordance with one or more implementations.
Figure 9:
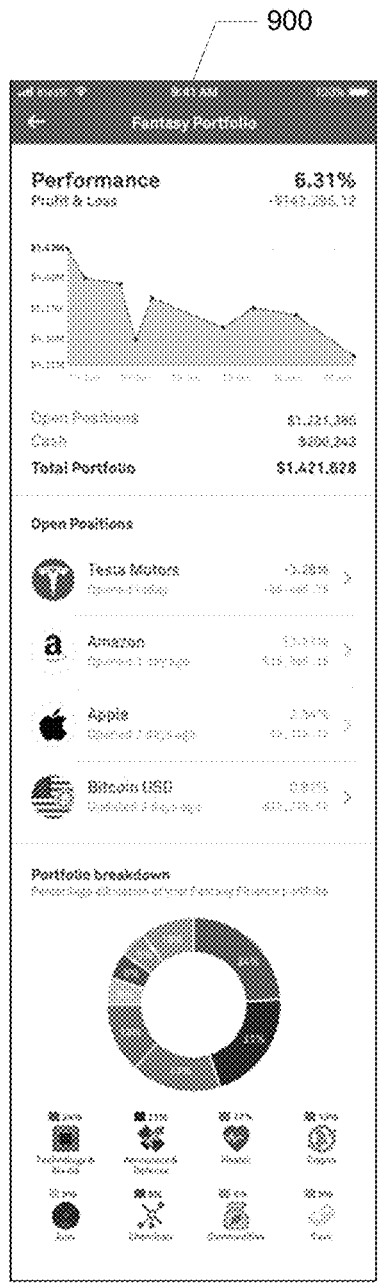
FIG. 9 is an example block diagram of an illustrative game portfolio environment in accordance with one or more implementations.
Figure 10:
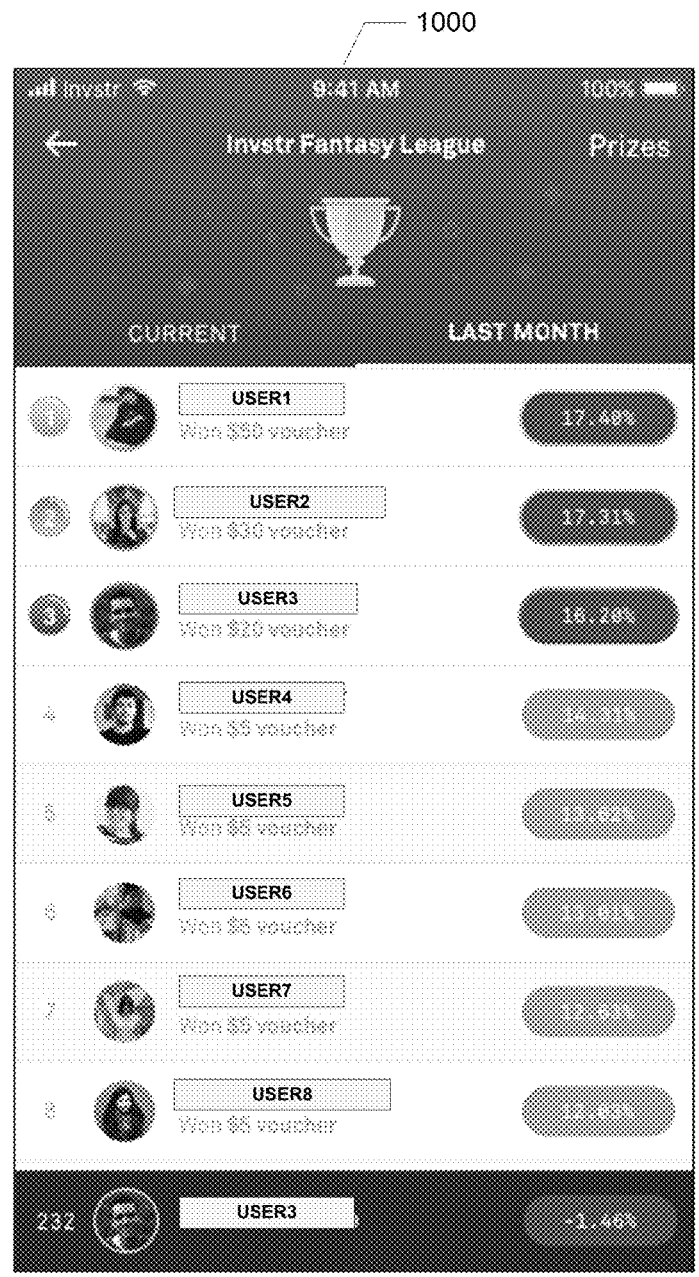
FIG. 10 is an example block diagram of an illustrative system league environment in accordance with one or more implementations.
Figure 11:
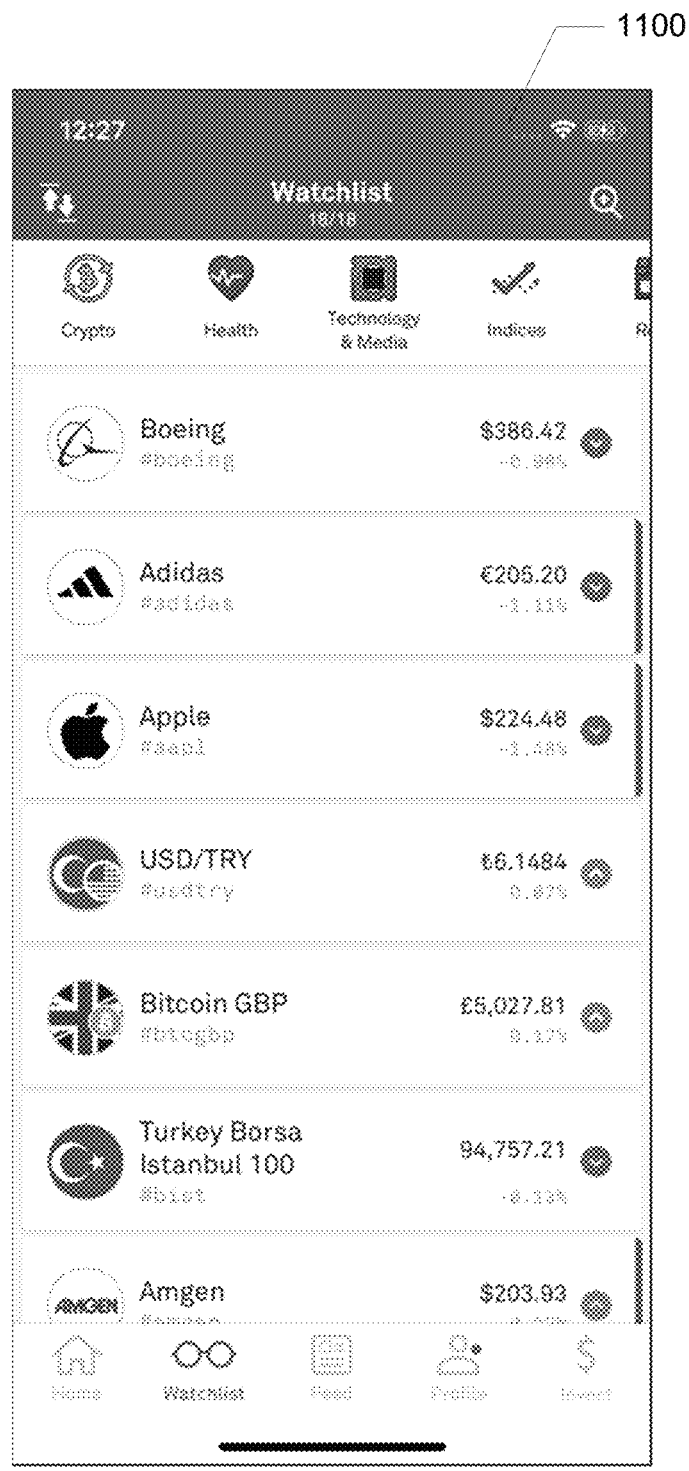
FIG. 11 is an example block diagram of an illustrative watchlist environment in accordance with one or more implementations.

With reference to FIGS. 3, 6 and 8, social media interaction module 312 implements social attribute data 326 about a user's social media interactions 800 within the system 300 and external networks. The social media interaction analysis may include social attribute records storage of who a user is following; who is following that user; the posts, likes, comments, internal and external shares that a user makes; which private leagues a user is in and who the other members of those private leagues are in the system. Social media interaction module 312 may be software system implementing an API containing functions/sub-routines.

With reference to FIGS. 3, 6, 9, 10, 11, 14, gamification module 314 implements game attribute data 328 about a user's game playing, The kinetic bitmoji data 500 may include a game link attribute data 518 to electronically link the module 314. This configuration enables the bitmoji data 500 to be ported or linked to various games configured to receive the bitmoji data 500. The gamification analysis may include the instruments a user has in their watchlist environment 1100 and in their portfolio 900, and what instruments the user buys or sells. In the gamification module 314 enables a virtual portfolio management game with a watchlist environment 1100 with watchlist attribute data, securities and individuals compete in the global digital virtual fantasy league environment 1000 with user league attribute data. In this way users of system 300 can learn organically that investing is about generating a consistent return on capital over time as well as employing diversification concepts without excessive trading. In some implementations, the system 300 enables users to create and manage their own private leagues and invite their friends, colleagues and classmates to compete against them. In some implementations, a group chat functions enables the members of a Private League to communicate among themselves. They can further collaborate in these private leagues with the user of group chat messaging. In this way, user can learn about investing in a risk free-way. In some implementations, module 314 includes digital trophies—awards by the technology platform in recognition of the user's progress or achievements across a variety of potential interactions. Gamification module 314 may be software system implementing an API containing functions/sub-routines.

With reference to FIGS. 3, and 6, matching module 316 implements attribute data 332 for matching each user's profile with auto-indexed content. The content may be indexed using machine learning techniques according to the present disclosure. The content with the strongest match is then provided to the user through a variety of publication techniques including notifications and the user's media feed 700. In some implementations, matching module 316 implements attribute data for matching users with other users. Users with similar interest profiles are 'introduced' to each other as suggested people to follow. This is performed in order to encourage engagement and peer-to-peer learning. In some implementations, matching module 316 implements attribute data for matching to include products, such as financial products. Some or all of the components of a user's profile, including their interests, financial performance, risk and behavioral characteristics can be used to match a user against financial products exhibiting similar characteristics. Matching module 316 may be software system implementing an API containing functions/sub-routines.

In one implementation of the present disclosure and with continued reference to FIG. 3, personal avatar engine/module 308, the system 300 represents users with changing or kinetic bitmojis in digital attribute data 323. These changes may be interpreted and digitally represented as mood swings between multiple personalities, which cause slight shifts in users' interests, even in the absence of interactions. One of the points in recommending media content (such as financial content) is that the content's relevance to consumer's interests is time-sensitive that is, what might be relevant at one time could easily become irrelevant when more recent media content becomes available. In accordance with at least one implementation of the system 300, the available media content at any point in time also can take account of changing consumer/user interests from one small time period to another period of time based on the dynamic changing in the bitmoji.

Referring to FIG. 12, in some implementations, system 300 with gamification module 314 employs Price and Portfolio Position Profit Alert Engine 2000 that is tasked to send alerts (in the form of mobile device notifications) to users regarding significant changes in security prices and large shifts in Profit and Loss positions of predictions made by the users (in games with gamification module 314). In some implementations, the system 300 draws a chart and posts it to the media feed 700 (e.g., #invstream) as a tweet if an instrument's latest price exceeds 52 weeks' low/high.

In some implementations of the system 300 and method, referring to FIGS. 3, 5, 14 and 17, print module 350 has machine readable instructions 306 configured to print a physical representation (e.g. image) of the bitmojis data 500 on to a plastic or metal card 1700 such as a payment card or debit card and the like. In some implementations, the described technologies can be used to print an image representative of kinetic avatar data on a substrate body. In one such implementation, a card 1700 may be printed onto a flexible substrate body of a flexible material (e.g., a flexible polymer). Multiple layers of this material may be bonded together to form a multiple layer flexible structure. This multiple layer structure may be laminated (e.g., via hot, warm and/or cold lamination) to form a card. The card 1700 may be programmed before or after lamination. In another implementation, a card 1700 may be printed/etched on a rigid substrate body of a largely rigid material (e.g., a precious or high density metal such as silver, titanium, tungsten or a high strength metal such as stainless steel, and may comprise a non-precious metal plated with a precious metal.) Multiple layers of the rigid substrate may include one or more non-conductive layers bonded together with metal layers to form a multiple layer sandwich structure (such as the APPLE card construction). A card 7100 may be programmed via a direct connection between a programmer and one or more contacts on a card. A card may be programmed via a capacitive, optical, or inductive communication via a communication link between a programmer and one or more components (e.g., a contact) on a card. A card with flexible substrate body or rigid substrate body may be laminated and capacitively, optically, or inductively programmed. External resources 340 shown in FIG. 3, may include a card printer in U.S. Pat. No. 7,992,774 which is incorporated by reference herein. One example of a commercially available card printer by Evolis, model Avansia may be used in one or more implementations of the present disclosure.

Figure 18:
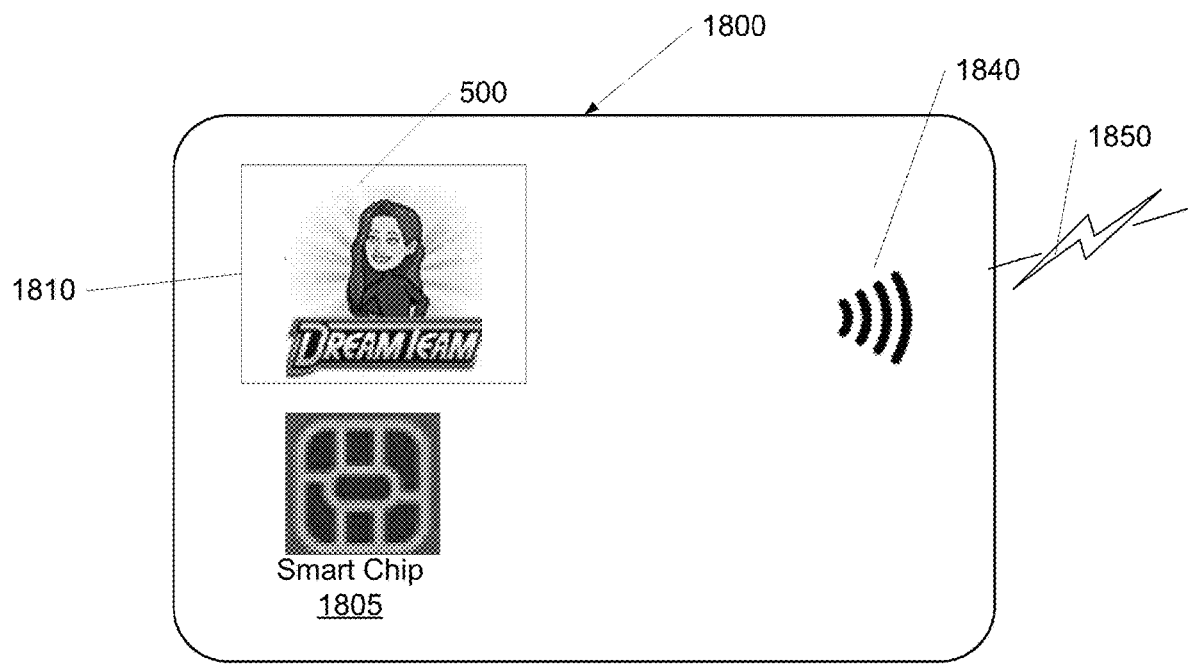
FIG. 18 is an illustrative functional block diagram of a card with kinetic personal avatar or kinetic bitmoji data that may be used to implement the processes and functions, in accordance with one or more implementations.
Figure 19:
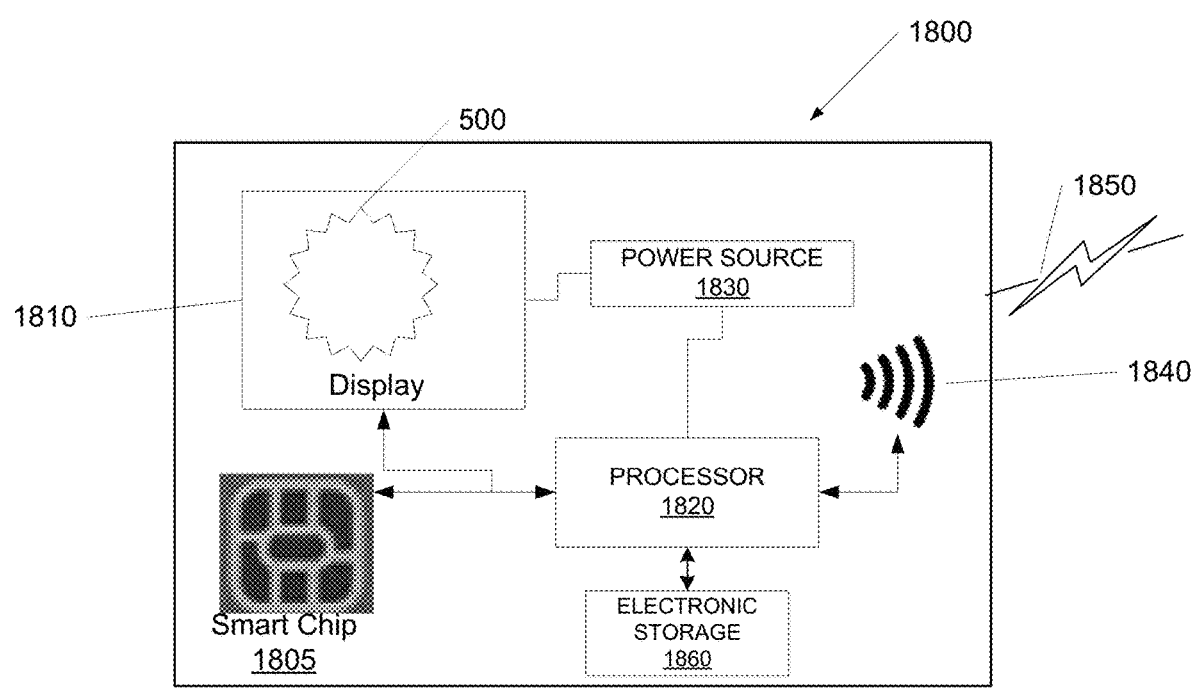
FIG. 19 is an illustrative functional block diagram of a card system that may be used to implement the processes and functions, in accordance with one or more implementations.

In some implementations of the system 300 and method, referring to FIG. 18 and FIG. 19, a card computing platform system 1800 (in one example, a flexible substrate body or rigid substrate body with computing platform 302) can have an LCD display screen 1810, and one or more on-board processor(s) 1820 with a wireless connection with an on-board battery 1830 to power components therein. Card 1800 may include electronic storage 1860, such as electronic storage 330, that may comprise non-transitory storage media that electronically stores data information. In one implementation, the card can have a computer-in-a-card technology offered by Dynamics, Inc. (www.dynamicsinc.com) or another card with antenna and transceiver technology, such as described in U.S. Pat. No. 7,784,687 (incorporated by reference herein). Additional external communication devices may be provided on card 1800. For example, a USB port or Wi-Fi antenna 1850 may be provided on a card. Such additional external communication devices may, for example, allow a user to communicate with stationary computer, laptop, or other device. Such communication devices may, for example, be utilized to load user-selectable kinetic bitmoji data 500 or other information (e.g., transactional or account information) from a laptop to card 1800 or other device.

In one implementation, RFID antenna 1840 may be provided on card 1800. Such an RFID antenna 1840 may be operable to transmit information provided by processor 1820. In this manner, for example, processor 1820 may communicate with an RFID device using RFID antenna 1840 and may communicate with a magnetic stripe on the back of the card 1800. Both RFID antenna 1840 and magnetic stripe may be utilized to communicate payment card information (e.g., credit card information) to a reader. Processor 1820 may also be electrically coupled to display screen 1810, such that user-selectable kinetic bitmoji data 500 can be displayed on display 1810. A smart-card chip 1705, 1805 using ISO/IEC 14443 and ISO/IEC 7816-4 (smart chip data with application protocol data units) may, for example, be included on card 1800 in lieu of, or in addition to, RFID device.

In some implementations, a mobile client (e.g., smart phones, wearable computing devices, tablets) communicates with the processor 1810 on card 1800 (in one or more examples, a flexible substrate body or rigid substrate body) to provide the user-selectable kinetic bitmoji data 500 to the electronic storage 1860 from virtual wallet 317. Referring to FIGS. 3 and 5, the card link data 516 may be configured to electronically link the user-selectable kinetic bitmoji data 500 to the card 1800 by display module 360 or other method to present on display screen 1810. Customized personal avatars and related content can be readily extrapolated into various specific financial emotion simulation templates and situations based upon a user generated original personal avatar provided by kinetic bitmoji data 500. Each of these avatars and content items can be adjusted and modified to suit particular preferences of a given user, and prior uses can be noted and organized by the system 300 as part of the maintaining process that is provided module 308. Hence, a user can have bitmoji data 500 linked to multiple cards 1800 at the same time to be displayed Persons skilled in the art will appreciate that a static magnetic track may be a read-write track such that information may be written to a magnetic track from a magnetic stripe reader that includes a head operable to magnetically encode data onto a magnetic track. Information may be written to a magnetic track as part of a payment process (e.g., a credit card or debit card transaction). Persons skilled in the art will appreciate that a static magnetic track may include a magnetic material that includes ferromagnetic materials that provide for flux-reversals such that a magnetic stripe reader can read the flux-reversals from the static magnetic track.

In some implementations, computing platform(s) 302, remote platform(s) 304, and/or external resources 340 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 302, remote platform(s) 304, and/or external resources 340 may be operatively linked via some other communication media.

A given remote platform 304 may include one or more processors configured to execute computer program modules. The computer program modules may be configured to enable an expert or user associated with the given remote platform 304 to interface with system 300 and/or external resources 340, and/or provide other functionality attributed herein to remote platform(s) 304. By way of non-limiting example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms.

External resources 340 may include sources of information outside of system 300, external entities participating with system 300, and/or other resources. In some implementations, some or all of the functionality attributed herein to external resources 340 may be provided by resources included in system 300.

Computing platform(s) 302 may include electronic storage 330, one or more processors 318, and/or other components. Computing platform(s) 302 may include communication lines, or ports to enable the exchange of information with a network and/or other computing platforms. Illustration of computing platform(s) 302 in FIG. 3 is not intended to be limiting. Computing platform(s) 302 may include a plurality of hardware, software, and/or firmware components operating together to provide the functionality attributed herein to computing platform(s) 302. For example, computing platform(s) 302 may be implemented by a cloud of computing platforms operating together as computing platform(s) 302.

Electronic storage 330 may comprise non-transitory storage media that electronically stores information. The electronic storage media of electronic storage 330 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 330 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 330 may include one or more virtual storage resources (e.g., cloud storage, a virtual private network, and/or other virtual storage resources). Electronic storage 330 may store software algorithms, information determined by processor(s) 318, information received from computing platform(s) 302, information received from remote platform(s) 304, and/or other information that enables computing platform(s) 302 to function as described herein.

Processor(s) 318 may be configured to provide information processing capabilities in computing platform(s) 302. As such, processor(s) 318 may include one or more digital processors, an analog processor, a digital circuit designed to process information, an analog circuit designed to process information, a state machine, and/or other mechanisms for electronically processing information. Although processor(s) 318 is shown in FIG. 3 as a single entity, this is for illustrative purposes only. In some implementations, processor(s) 318 may include a plurality of processing units. These processing units may be physically located within the same device, or processor(s) 318 may represent processing functionality of a plurality of devices operating in coordination. Processor(s) 318 may be configured to execute modules 308, 310, 312, 314, 316, 317, 350, 360 and/or other modules. Processor(s) 318 may be configured to execute modules 308, 310, 312, 314, 316 and/or 317, 350, 360, and/or other modules by software; hardware; firmware; some combination of software, hardware, and/or firmware; and/or other mechanisms for configuring processing capabilities on processor(s) 318. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308, 310, 312, 314, 316, 317, 350 and 360 are illustrated in FIG. 3 as being implemented within a single processing unit, in implementations in which processor(s) 318 includes multiple processing units, one or more of modules 308, 310, 312, 314, 316 and/or 317, 350, 360 may be implemented remotely from the other modules. The description of the functionality provided by the different modules 308, 310, 312, 314, 316, 317, 350, and/or 360 described below is for illustrative purposes, and is not intended to be limiting, as any of modules 308, 310, 312, 314, 316 and/or 317, 350, 360 may provide more or less functionality than is described. For example, one or more of modules 308, 310, 312, 314, 316, 317, 350, and/or 360 may be eliminated, and some or all of its functionality may be provided by other ones of modules 308, 310, 312, 314, 316, 317, 350, and/or 360. As another example, processor(s) 318 may be configured to execute one or more additional modules that may perform some or all of the functionality attributed below to one of modules 308, 310, 312, 314, 316, 317, 350, and/or 360.

Figure 4:
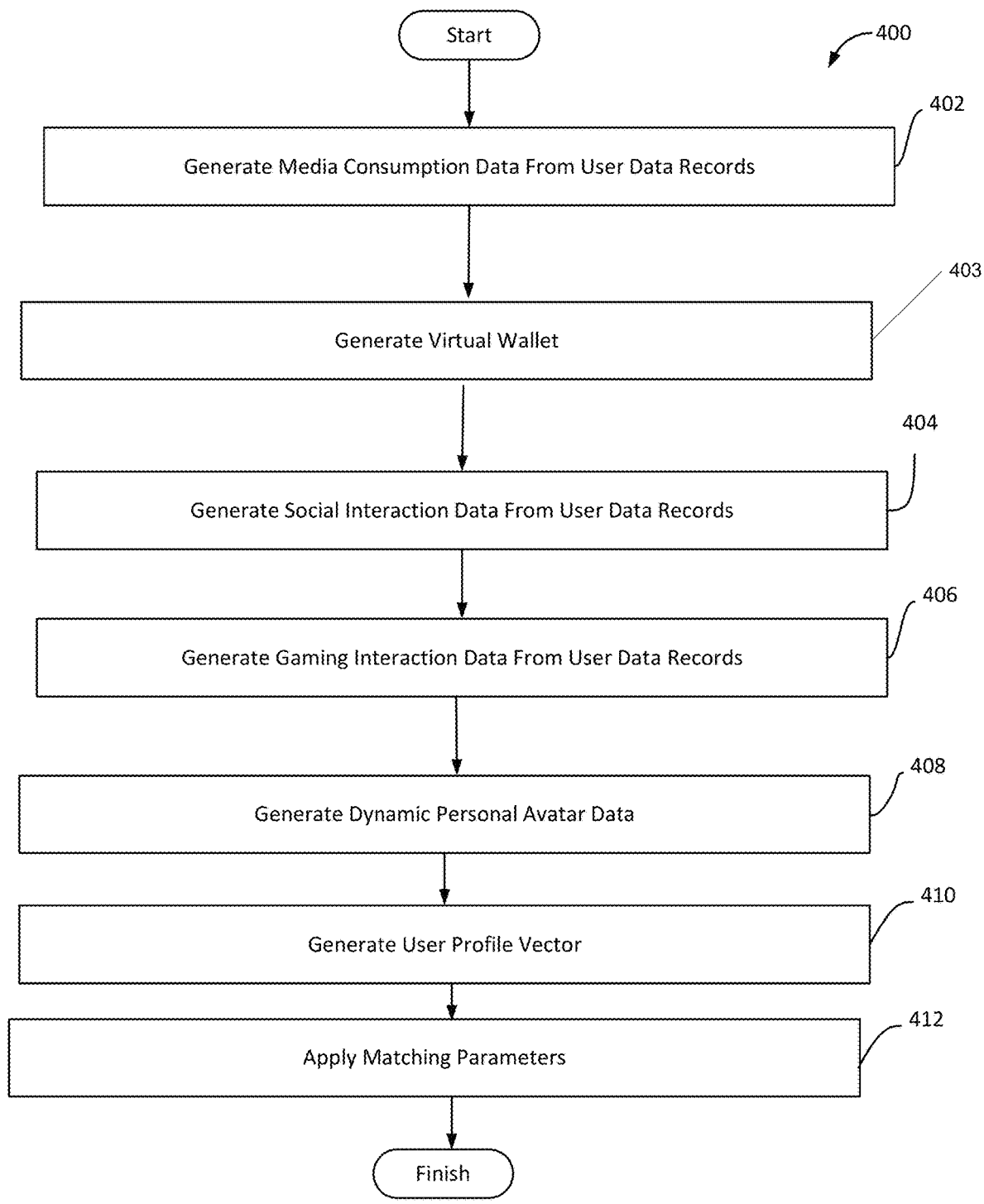
FIG. 4 illustrates a method for data processing, in accordance with one or more implementations.

FIG. 4 illustrates a method 400 for data processing, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

FIG. 4 illustrates method 400, in accordance with one or more implementations. An operation 402 may include generating media consumption data from a computer readable set of user data records. Operation 402 may be performed by one or more hardware processors configured by machine-readable instructions including a module that is the same as or similar to module 310, in accordance with one or more implementations.

An operation 403 may include electronically processing the computer readable set of user data records to generate a virtual wallet. Operation 403 may be performed by one or more hardware processors configured by machine-readable instructions including a module that is the same as or similar to module 317, in accordance with one or more implementations.

An operation 404 may include electronically processing the computer readable set of user data records to generate social interaction data 800. Operation 404 may be performed by one or more hardware processors configured by machine-readable instructions including a module that is the same as or similar to module 312, in accordance with one or more implementations.

An operation 406 may include electronically processing the computer readable set of user data records to generate gaming interaction data. Operation 406 may be performed by one or more hardware processors configured by machine-readable instructions including a module that is the same as or similar to module 314, in accordance with one or more implementations.

An operation 408 may include electronically processing personal avatar data. Operation 408 may be performed by one or more hardware processors configured by machine-readable instructions including a module that is the same as or similar to module 308, in accordance with one or more implementations.

An operation 410 may include generating a computer readable user profile vector or profile vector associated with at least one of the user data records or each of the user data records. Operation 410 may be performed by one or more hardware processors configured by machine-readable instructions including a module that is the same as or similar to module 308, in accordance with one or more implementations.

An operation 412 may include electronically processing the user profile to generate matching parameters. Operation 412 may be performed by one or more hardware processors configured by machine-readable instructions including a module that is the same as or similar to module 316, in accordance with one or more implementations.

Aspects of the present disclosure provide a rich user experience by integrating one or more of personalized content, gamification of the financial markets, social features and ecommerce capabilities in a single user experience.

Figure 13:
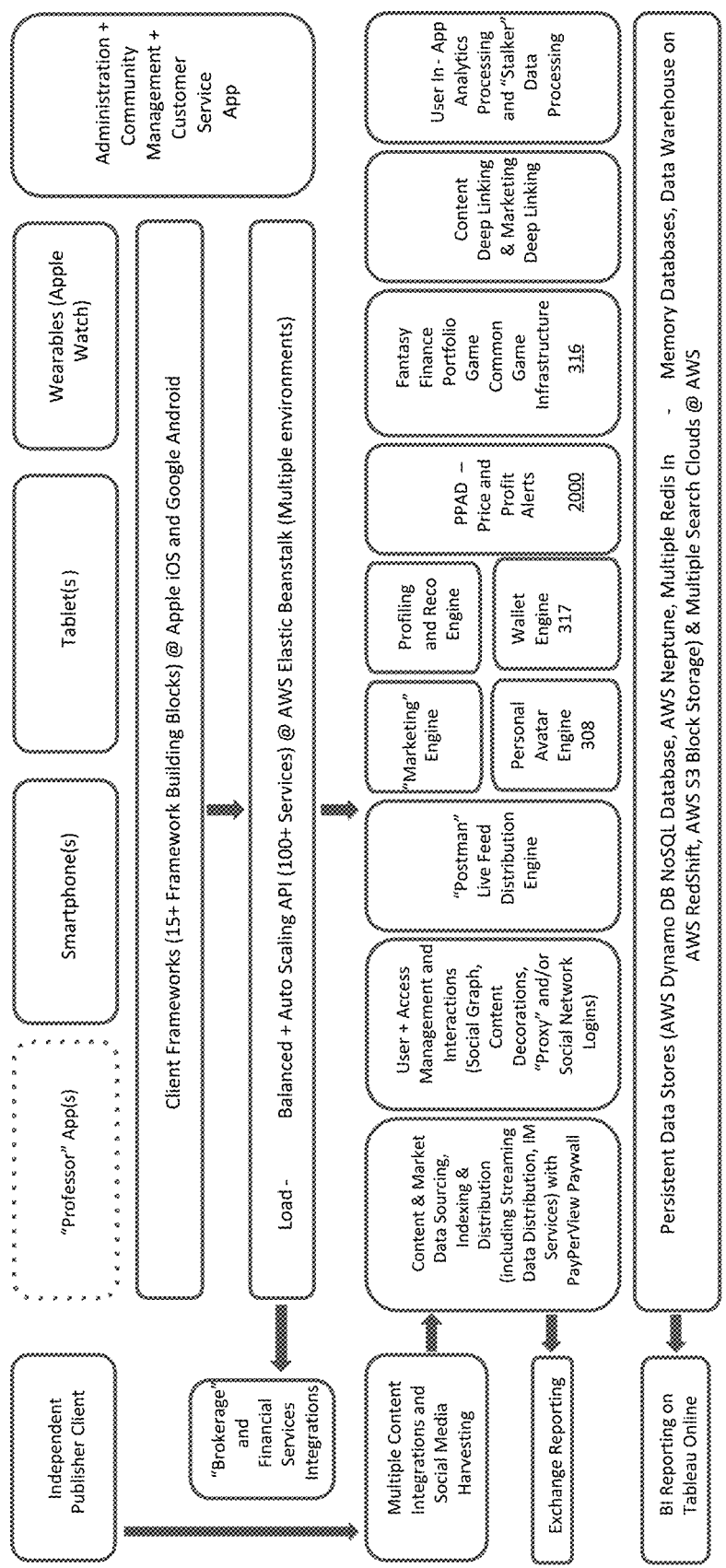
FIG. 13 is a schematic diagram of a digital computing environment in which certain aspects of the present disclosure may be implemented.

FIG. 13 illustrates a schematic diagram of a digital computing environment 300' in which certain aspects of the present disclosure may be implemented. In some implementations, modules 308, 310, 312, 314, 316 and 317 as discussed are used in environment 300'. In some implementations, there is provided a portfolio page displaying the client's investment portfolio and the historical performance of the portfolio. In some implementations, there is provided a watchlist displaying the financial instruments that the client is following. In some implementations, there is provided a section where the client can discover new instruments to follow or invest in. In some implementations, there is provided an Instrument Hub where the client can see fundamental data for each financial instrument; community sentiment; historical, comparison and technical charting; and a dedicated news feed including news articles, research reports and events calendar for each financial instrument. In some implementations, there is provided a 'Trade screen' where a client can execute transactions. In some implementations, there is provided a Leaderboard page where the client can find the top performers within the community. In some implementations, there is provided a track record function—an analysis of a client's portfolio describing her performance; implicit investment mandate; investment style based on financial factor analysis; behavioral analysis of a user's investment transaction history; a measure of a user's success in timing the entry and exit of their investment decisions. In some implementations, there is provided the ability for a user to open bank and brokerage accounts and spend their funds using a connected debit card or invest her money across a broad range of financial assets and crypto currencies.

Systems 300 and 300' makes possible the empowerment of the individual using technology. Personal avatar module 308 with bitmojis 500 offer a way for users to create and manage their own personal financial brand. This will help to increase the engagement of the user with the financial service or product being provided with the added benefit of reinforcing the best practice in personal financial management. System 300 drives client engagement and to help clients build confidence, knowledge and wealth in a financial investing context. It overcomes problems that have been identified when it comes to popularizing investing. While the present technology has been described for the purpose of illustration based on what is currently considered to be the most practical and preferred implementations, aspects of the present disclosure could be applied to numerous other industry verticals wherever technology platforms or service providers seek to create maximum client engagement, personalization and convenience.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A computer implemented method of data processing with computer readable instructions, comprising:
    electronically processing a computer readable set of user data records;
    electronically processing the computer readable set of user data records associated with a computer readable encrypted virtual wallet containing computer readable kinetic avatar data associated with at least one of the user data records;
    displaying the computer readable kinetic avatar data responsive to a mobile client;
    processing computer readable encoded data associated with a non-transient computer-readable storage medium configured with flux-reversal card attribute data; wherein the kinetic avatar data includes computer readable user selectable attribute data including card link data associated with the flux-reversal card attribute data.

2. The method of claim 1, further comprising electronically processing the computer readable set of user data records to generate social interaction data.

3. The method of claim 1, wherein the virtual wallet includes a digital virtual credit card attribute data.

4. The method of claim 1, wherein the virtual wallet includes a digital virtual debit card attribute data.

5. The method of claim 1, further comprising electronically processing the computer readable set of user data records to generate gaming interaction data.

6. The method of claim 5, wherein the gaming interaction data includes user attribute data.

7. The method of claim 5, wherein the computer readable kinetic avatar data includes bitmoji data.

8. The method of claim 1, wherein the computer readable kinetic avatar data includes bitmoji data.

9. The method of claim 1, wherein the computer readable the kinetic avatar data is configured with mood attribute data and expression attribute data associated with the at least one of the user data records.

10. A system configured for data processing, the system comprising:
    one or more hardware processors configured by machine-readable instructions to:
        electronically process a computer readable set of user data records;
        electronically process the computer readable set of user data records to generate a computer readable virtual wallet with user kinetic avatar data associated with at least one of the user data records; and
        electronically process computer readable encoded data from a non-transient computer-readable storage medium configured with flux-reversal card attribute data; wherein the kinetic avatar data includes computer readable user selectable attribute data including card link data associated with the flux-reversal card attribute data.

11. The system of claim 10, wherein the one or more hardware processors are further configured by machine-readable instructions to electronically process the computer readable set of user data records to generate social interaction data.

12. The system of claim 10, wherein the virtual wallet includes a digital virtual credit card attribute data.

13. The system of claim 10, wherein the virtual wallet includes a digital virtual debit card attribute data.

14. The system of claim 10, further comprising electronically processing the computer readable set of user data records to generate gaming interaction data.

15. The system of claim 10, further comprising generating printing data to print an instance of the user kinetic avatar data on a thin substrate body.

16. The system of claim 14, wherein the user kinetic avatar data includes bitmoji data.

17. The system of claim 10, wherein the user kinetic avatar data includes bitmoji data configured with mood attribute data and expression attribute data associated with the at least one of the user data records.

18. A computing platform configured for data processing, the computing platform comprising:
   a first non-transient computer-readable storage medium having executable instructions embodied thereon; and
   one or more hardware processors configured to execute the instructions to:
      electronically process a computer readable set of user data records;
      electronically process the computer readable set of user data records to generate displayable computer readable selectable kinetic bitmoji data associated with at least one of the user data records;
      display the computer readable selectable kinetic bitmoji data with a display module responsive to a mobile client; and
      electronically process computer readable smart chip data associated with the least one of the user data records;
   wherein the computer platform includes a second non-transient computer-readable storage medium having executable instructions embodied thereon being configured with flux-reversal card attribute data; wherein the computer readable selectable kinetic bitmoji data includes computer readable card link attribute data associated with the flux-reversal card attribute data, and computer readable mood attribute data associated with at least one of the user data records.

19. The computing platform of claim 18, wherein the one or more hardware processors are further configured by instructions to electronically process the user data records being associated with digital virtual credit card attribute data.

20. The computing platform of claim 18, wherein the one or more hardware processors are further configured by instructions to process the user data records being associated with digital virtual debit card attribute data.

21. The computing platform of claim 18, wherein the one or more hardware processors are further configured by instructions to electronically process RFID data associated with the least one of the user data records.

22. The computing platform of claim 21, further comprising a substrate body, a display electronically connected to the one or more hardware processors, and an antenna electronically configured to process the RFID data, wherein the non-transient computer-readable storage medium, the one or more hardware processors and the antenna are housed by the substrate body.

* * * * *